(12) United States Patent
Hou et al.

(10) Patent No.: US 10,407,647 B2
(45) Date of Patent: Sep. 10, 2019

(54) DEFOAMING AGENT FOR LIQUID DETERGENT

(71) Applicant: JIANGSU SIXIN SCIENTIFIC-TECHNOLOGICAL APPLICATION RESEARCH INSTITUTE CO., LTD., Nanjing, Jiangsu (CN)

(72) Inventors: Wei Hou, Nanjing (CN); Fei Wu, Nanjing (CN); Tian Cao, Nanjing (CN); Wei Huang, Nanjing (CN); Youzhong Yang, Nanjing (CN)

(73) Assignee: JIANGSU SIXIN SCIENTIRIC-TECHNOLOGICAL APPLICATION RESEARCH INSTITUTE CO., LTD., Nanjing (CN)

( * ) Notice: Subject to any disclaimer, the term of this patent is extended or adjusted under 35 U.S.C. 154(b) by 291 days.

(21) Appl. No.: 15/502,749

(22) PCT Filed: Aug. 18, 2014

(86) PCT No.: PCT/CN2014/084635
§ 371 (c)(1),
(2) Date: Feb. 8, 2017

(87) PCT Pub. No.: WO2016/019598
PCT Pub. Date: Feb. 11, 2016

(65) Prior Publication Data
US 2017/0233681 A1    Aug. 17, 2017

(30) Foreign Application Priority Data
Aug. 8, 2014   (CN) .......................... 2014 1 0390783

(51) Int. Cl.
*C11D 3/00*     (2006.01)
*C11D 3/37*     (2006.01)
*B01D 19/04*    (2006.01)
*C08L 83/04*    (2006.01)
*C08L 83/08*    (2006.01)

(52) U.S. Cl.
CPC ............ *C11D 3/0026* (2013.01); *B01D 19/04* (2013.01); *B01D 19/0409* (2013.01); *C08L 83/04* (2013.01); *C08L 83/08* (2013.01); *C11D 3/00* (2013.01); *C11D 3/37* (2013.01); *C11D 3/373* (2013.01); *C11D 3/3738* (2013.01); *C11D 3/3788* (2013.01); *C08L 2205/02* (2013.01); *C08L 2205/025* (2013.01)

(58) Field of Classification Search
CPC ......... C11D 3/0026; C11D 1/82; C11D 1/825; C11D 3/373
See application file for complete search history.

(56) References Cited

U.S. PATENT DOCUMENTS

| | | | | |
|---|---|---|---|---|
| 3,984,347 A * | 10/1976 | Keil | ................ | B01D 19/0409 516/118 |
| 4,468,491 A * | 8/1984 | Steinberger | ............ | B01D 19/04 516/124 |
| 4,562,223 A * | 12/1985 | Steinberger | ........ | B01D 19/0409 524/266 |
| 4,698,178 A * | 10/1987 | Huttinger | ................. | A61K 8/06 106/287.14 |
| 5,055,229 A * | 10/1991 | Pelton | ................ | B01D 19/0409 516/120 |
| 5,486,306 A * | 1/1996 | L'Hostis | ............ | B01D 19/0409 510/228 |
| 5,599,481 A * | 2/1997 | Walger | ............... | B01D 19/0404 516/120 |
| 5,645,762 A * | 7/1997 | Cook | ................. | B01D 19/0404 162/29 |
| 5,939,478 A * | 8/1999 | Beck | ...................... | A61K 8/042 424/59 |
| 6,001,887 A * | 12/1999 | Keup | ................. | B01D 19/0409 516/118 |
| 6,177,481 B1 * | 1/2001 | Grape | ................ | B01D 19/0404 516/117 |
| 8,536,109 B2 * | 9/2013 | Delbrassinne | ..... | B01D 19/0404 510/222 |
| 2004/0106749 A1 * | 6/2004 | Burger | ............... | B01D 19/0409 525/474 |
| 2004/0229964 A1 * | 11/2004 | Knott | ................. | B01D 19/0409 516/118 |
| 2005/0020464 A1 * | 1/2005 | Smith | .................. | C11D 3/0073 510/220 |
| 2006/0020082 A1 * | 1/2006 | Rautschek | ......... | B01D 19/0409 524/863 |
| 2008/0075683 A1 * | 3/2008 | Herzig | ................... | A61K 8/068 424/70.12 |
| 2009/0007483 A1 * | 1/2009 | Hansel | .................. | C08G 77/46 44/320 |
| 2009/0137446 A1 * | 5/2009 | Rautschek | ......... | B01D 19/0404 510/347 |

(Continued)

FOREIGN PATENT DOCUMENTS

CN         103272411 A  *  9/2013

OTHER PUBLICATIONS

Machine translation of CN-103272411-A, 2019 (Year: 2019).*

(Continued)

*Primary Examiner* — Liam J Heincer
(74) *Attorney, Agent, or Firm* — Oliff PLC

(57) ABSTRACT

Provided is a defoaming agent for a liquid detergent, comprising the following components: component A1, a modified polyorganosiloxane formed by reacting a hydrogen-containing polyorganosiloxane, an unsaturated polyether and an α-olefin; component A2, a modified polyorganosiloxane formed by reacting a hydrogen-containing polyorganosiloxane, an unsaturated polyether and a bivinyl-terminated polyorganosiloxane; component B, an organosilicon composition composed of a hydrogen-containing polyorganosiloxane, a polymer composed of an acrylate and an α-olefin, silica and an organosilicon resin; component C, a thickening agent; and component D, water. An excellent compatibility between the modified polyorganosiloxanes A1 and A2 enables the defoaming agent to exhibit an excellent defoaming performance, stability and clarity in a laundry detergent.

23 Claims, No Drawings

(56) References Cited

U.S. PATENT DOCUMENTS

| | | | | |
|---|---|---|---|---|
| 2009/0270529 A1* | 10/2009 | Kume | C08F 230/08 | 523/122 |
| 2010/0029861 A1* | 2/2010 | Esselborn | C08G 65/2609 | 525/474 |
| 2010/0084597 A1* | 4/2010 | Schwab | B01D 19/0404 | 252/8.86 |
| 2011/0070183 A1* | 3/2011 | Neumann | A61K 8/06 | 424/78.02 |
| 2011/0091399 A1* | 4/2011 | Meyer | A61K 8/06 | 424/59 |
| 2011/0218137 A1* | 9/2011 | Rautschek | B01D 19/0404 | 510/405 |
| 2011/0245412 A1* | 10/2011 | Schubert | C08G 77/18 | 524/588 |
| 2012/0027704 A1* | 2/2012 | Henning | A61K 8/892 | 424/59 |
| 2013/0213267 A1* | 8/2013 | Fiedel | C08L 83/12 | 106/403 |
| 2013/0345318 A1* | 12/2013 | Schubert | C08G 77/46 | 514/772 |
| 2017/0145244 A1* | 5/2017 | Yang | C08F 2/22 | |
| 2017/0295799 A1* | 10/2017 | Eiben | A01N 63/04 | |

OTHER PUBLICATIONS

Acticide MV (https://adhesives.specialchem.com/product/a-thor-acticide-mv, 2017) (Year: 2017).*

* cited by examiner

DEFOAMING AGENT FOR LIQUID DETERGENT

BACKGROUND

Technical Field

The disclosure provides a defoaming agent for a liquid detergent, having a strong foam control effect, capable of ensuring clarity of detergents, and belonging to the technical field of fine chemical.

Related Art

As daily necessities for people, liquid detergents have become prevailing detergents because they are simple in process equipment, are easy to use, are fast dissolving, are milder for fabric and skin, etc. Due to high content and much foam, surfactants are difficult to rinse, not only waste water resources, and increase the washing cost, but also will result in large-scale water pollution, and go against energy conservation, emission reduction and environmental protection.

Because of low surface tension, defoaming agents can quickly penetrate into the foam system, resulting in the bubble burst. When added to a liquid detergent, the defoaming agent can effectively solve the problem of much foam and difficult rinse in the washing process. At present, the defoaming agents used in detergents are mainly organosilicone defoaming agents. However, for non-structural detergents, besides and defoaming performance, compatibility and clarity have always been very important knotty problems, especially clarity. After addition of an organosilicone defoaming agent, a detergent will become turbid, and fail to reach aesthetic requirements.

Polydimethylsiloxane has relatively small surface tension. But due to relatively poor compatibility with organics, there is weak affinity between the active components of a defoaming agent and a foam film, thereby resulting in poor defoaming performance. DE-A2025722 discloses to disperse hydrophobic silica in polydimethylsiloxane, but the obtained defoaming agent has a poor defoaming performance. DE-B2222998 selects to introduce a polyether group into polydimethylsiloxane. The introduction of the polyether group solves the compatibility problem, but the defoaming efficiency is low, thereby increasing the use cost.

After grafting a hydrophobic group onto the chain of polydimethylsiloxane, the hydrophobic performance is improved, but the compatibility with organics is significantly improved, and the affinity between defoaming particles and a foam film is enhanced, thereby contributing to defoaming. EP1075864 discloses a foam control agent for a liquid detergent, comprising an organic-based polysiloxane material, an organosilicon resin and a hydrophobic filler, wherein the organopolysiloxane material comprises organopolysiloxane having at least one silicon-bonded substituent having the molecular formula X—Ar, wherein X represents a divalent aliphatic group bonded to silicon through a carbon atom, and Ar represents an aromatic group. Organic-based resin is selected from the group consisting of siloxane units having the formula $RaSiO_{(4-a)/2}$, wherein R represents a hydroxyl group, a hydrocarbon or ahydrocarbonoxy group and a has an average value from 0.5 to 2.4. EP1075863 discloses a foam inhibitor with similar composition, except that it contains a water-insoluble organic liquid, which may be a mineral oil, a liquid polyisobutene or a vegetable oil. CN102307978A also discloses a foam inhibitor with similar composition, comprising, on the basis of EP1075864, an organopolysiloxane resin having at least one polyoxyalkylene group, wherein the organopolysiloxane resin comprises tetrafunctionalsiloxane units having the formula $RSiO_{4/2}$ and monofunctionalsiloxane units having the formula $R_3SiO_{4/2}$. The total number of tetrafunctionalsiloxane units in the resin is at least 50% based on the total number of siloxane units, and R represents a hydroxyl group. This liquid foam inhibitor is used in heavy duty liquid (HDL) detergents to solve the stability and foam control performance of the composition in detergents, but the turbidity of liquid detergents is increased in appearance.

Polyorganosiloxane is modified with an alkyl group to improve the binding force between the organosilicone defoaming composition and organic materials, so that the synthetic organosilicon emulsion has excellent defoaming performance in anionic and non-ionic systems. EP0578424 discloses a foam inhibitor comprising a polydimethylsiloxane with an alkyl side chain, wherein the alkyl side chain contains 9 to 35 carbon atoms, and 40 to 100% silicone composition carries a hydroxyl group having 9 to 35 carbon atoms. EP0121210 discloses a modified phlysiloxane having an alkyl group having 6 to 30 carbon atoms, provided that the number of carbon atoms accounts for 30 to 65% in the group "—CH2-", in order to obtain an efficient defoaming agent in combination with a mineral oil. CN102698475A introduces a defoaming composition, which is characterized by being prepared by the following steps of: obtaining an alkyl-modified polyorganosilicone through reaction of a hydrogen-containing polyorganosilicone, an α-olefin and a vinyl polyorganosilicone; and adding silica, an organic silicon resin and an aminopolyorganosilicone, mixing same so as to obtain an organosilicone defoaming composition, which can be used for a defoaming component in organosilicone emulsions and solid defoaming agents. A solid particle defoaming agent prepared by using the obtained active component has a sustained release effect and a foam control effect. When added to a washing powder, the solid particle defoaming agent can guarantee rich foam in the early stage of washing, fully washing, convenient rinse in the late stage of washing, and a water saving effect. Addition of the aminopolyorganosiloxane thereto can improve the softness of fabrics. CN103272411A relates to a foam inhibitor and a preparation process thereof. The preparation process comprises: obtaining a polyorganosiloxane modified by an alkyl and an unsaturated polyether through reaction of a hydrogen-containing polyorganosiloxane, an unsaturated polyether and an α-olefin in the presence of an acid catalyst; and then adding a hydrophobic particle and an organosilicon resin, mixing same, preparing an O/W emulsion of defoaming agent through emulsification of the active component of the obtained foam inhibitor, and adding the O/W emulsion of the defoaming agent to a non-structural detergent. The foam inhibitor can solve the clarity and attenuation of defoaming properties, but will still have the problem of defoaming agent precipitation after prolonged storage.

CN102307978A discloses an organopolysiloxane polymer, the preparation of which comprises: preparing a crosslinked siloxane polymer through reaction of a linear hydrogen-containing polyorganosiloxane and bivinylpolysiloxane in the presence of a catalyst, and then introducing a polyoxyalkylenesiloxane into the crosslinked polymer to obtain a crosslinked siloxane polymer with side chains. A defoaming composition prepared from the polymer and an organic-based siloxane material containing X—Ar is used in a detergent to have better defoaming properties. But its stability in the detergent is not disclosed. These polymers are described in, for example, EP0663225, CN1331278 and EP1167502B1.

The emulsifier used in preparing an O/W emulsion from an organosilicon composition must have strong affinity with the composition, and can form a stable monomolecular film on the surface of oil drops. For an organosilicon composition with alkyl groups, due to the presence of alkyl groups, ordinary siloxane polymer containing a polyoxyalkylenesiloxane is less compatible with the siloxane composition. Moreover, a single emulsifier cannot reach the effect of compounding a plurality of emulsifiers.

SUMMARY

The present invention compounds a branched siloxane polymer modified by an alkyl and a polyether with a crosslinked modified siloxane polymer prepared from an unsaturated polyether, a bivinyl-terminated polyorganosiloxane and a hydrogen-containing polyorganosiloxane, so as to reach a better emulsification and dispersion effect for organosilicon compositions having alkyl groups. The compatibility and synergistic effect between both and other components enable the prepared defoaming agent emulsion to have excellent defoaming performance and clarity in a liquid detergent, and also have excellent stability, so as to ensure that the defoaming agent neither precipitates, nor aggregates in a laundry detergent, and effectively solve the phenomena, such as coagulation and aggregation.

The objective of the present invention can be achieved through the following measures:

A defoaming agent for a liquid detergent comprises the following components:

a component A1: 2-25 parts by weight of a modified polyorganosiloxane formed by reacting a hydrogen-containing polyorganosiloxane, an unsaturated polyether and an α-olefin;

a component A2: 2-25 parts by weight of a modified polyorganosiloxane formed by reacting a hydrogen-containing polyorganosiloxane, an unsaturated polyether and a bivinyl-terminated polyorganosiloxane;

a component B: 2-20 parts by weight of an organosilicon composition composed of an acrylate and a polyorganosiloxane modified through grafting with an α-olefin, silica and an organosilicon resin;

a component C: 0.5-5 parts by weight of a thickening agent; and a component D: 50-90 parts by weight of water.

The defoaming agent for a liquid detergent referred to in the present invention can be formed by mixing the above components only, can further include other components, such as a pH regulating agent or a catalyst existing in the components, and can be further added with other components without bad effects on the overall performance of the present invention to further improve the performance in an aspect or some aspects, for example, the defoaming agent further includes a component E: 1-10 parts by weight of an emulsifier, or can further include a component F: 0.01-0.5 parts by weight of a preservative. The present invention can also further only include any one or a combination of two of the component E and component F.

In a technical solution, in the components composing the defoaming agent, the use level and mixing ratio are: component A1: 4-15 parts by weight, component A2: 5-20 parts by weight, component B: 5-15 parts by weight, component C: 0.5-5 parts by weight, component D: 60-80 parts by weight, and component E: 1-10 parts by weight.

In another technical solution, in the components composing the defoaming agent, the use level and mixing ratio are: component A1: 4-10 parts by weight, component A2: 5-18 parts by weight, component B: 8-15 parts by weight, component C: 0.5-5 parts by weight, component D: 60-80 parts by weight, and component E: 1-10 parts by weight.

The components of the present invention can be prepared by using existing process. For example, the raw material of component B organosilicon composition contains the components that are not used in the prior art, but can still be prepared using existing process.

In a specific technical solution, a component A1 modified polyorganosiloxane is obtained through reaction of a hydrogen-containing polyorganosiloxane, an unsaturated polyether and an α-olefin in the presence of a catalyst at 80-180° C.

In a preferred solution, the mass ratio of the monomers in component A1 is: a hydrogen-containing polyorganosiloxane:an unsaturated polyether:an α-olefin=(40-80):(20-40):(10-30).

In a specific technical solution, a component A2 modified polyorganosiloxane is obtained through reaction of a hydrogen-containing polyorganosiloxane, an unsaturated polyether and a bivinyl-terminated polyorganosiloxane in the presence of a catalyst at 80-180° C.

In a preferred solution, the mass ratio of the monomers in component A2 is: a hydrogen-containing polyorganosiloxane:an unsaturated polyether:a bivinyl-terminated polyorganosiloxane=(40-80):(20-40):(10-30).

In a specific technical solution, the preparation process of component B is as follows: firstly a hydrogen-containing polyorganosiloxane is fully mixed with an acrylate, to which a catalyst is added at 60-80° C. Then, after the system is heated to 90-110° C. and kept at the temperature, an α-olefin is added thereto, and further kept at the temperature. Finally, silica and an organosilicon resin are added and mixed to obtain the component B.

In a preferred solution, the mass ratio of the raw materials in component B is: a hydrogen-containing polyorganosiloxane:an acrylate:an α-olefin:silica:an organosilicon resin=(40-80):(3-15):(10-30):(1-15):(5-20).

The contents in each part of the present invention are further described in detail as follows.

A. Modified Polyorganosiloxane (Including Components A1 and A2)

In the present invention, the modified polyorganosiloxane is obtained through reaction of a modifying group and a hydrogen-containing polyorganosiloxane in the presence of a catalyst. The modifying group is two or three selected from the group consisting of an unsaturated polyether, an α-olefin and a bivinyl-terminated polyorganosiloxane. The average viscosity of the modified polyorganosiloxane at 25° C. is 10-30,000 mPa·S, preferably 100-3,000 mPa·s.

A(I) Hydrogen-Containing Polyorganosiloxane:

A hydrogen-containing polyorganosiloxane at least has a general structural formula as follows:

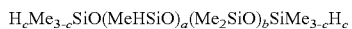

$H_cMe_{3-c}SiO(MeHSiO)_a(Me_2SiO)_bSiMe_{3-c}H_c$

Me is a methyl group, the subscript c is 0 or 1, and a is an integer from 2 to 100, preferably an integer from 10 to 70. b is an integer from 20 to 300, preferably an integer from 40 to 200. Each molecule has at least 2 silicon-bonded hydrogen atoms. The dynamic viscosity of the hydrogen-containing polyorganosiloxane at 25° C. is 20-5,000 mPa·s. In a solution, there are 40-80 parts by weight of a hydrogen-containing polyorganosiloxane in the modified polyorganosiloxane.

A (II): Unsaturated Polyether

The unsaturated polyether has the general structure formula as follows:

$$ViCH_2O(EO)_x(PO)_yR^1$$

Vi is a vinyl, $R^1$ is selected from hydrogen, alkyl group having 1 to 6 carbon atoms, ester group, epoxy group or amino group; EO is ethylene oxide, PO is propylene oxide, x and y are degrees of polymerization, x is an integer from 0 to 150, preferably from 0 to 40; and y is an integer from 0 to 150, preferably from 0 to 100. x and y cannot both be 0. In a solution, there are 20-40 parts by weight of an unsaturated polyether in the modified polyorganosiloxane.

A(III): α-olefin

The α-olefin has the general structural formula as follows:

$$Vi(CH_2)_zH$$

Vi is a vinyl, and z is an integer from 1 to 36, preferably an integer from 6 to 18. In a solution, there are 10-30 parts by weight of an α-olefin in the modified polyorganosiloxane.

A (IV): Bivinyl-Terminated Polyorganosiloxane:

The bivinyl-terminated polyorganosilicone has the general structural formula as follows:

$$Vi(R^2)_2SiO((R^2)_2SiO)_mSi(R^2)_2Vi$$

m is an integer from 100 to 500, preferably from 200 to 400; $R^2$ is an alkyl group having 1-6 carbon atoms, preferably a methyl group. The dynamic viscosity of the bivinyl-terminated polyorganosiloxane at 25° C. is 50-2,000 mPa·s. In a solution, there are 10-30 parts by weight of a bivinyl-terminated polyorganosiloxane in the modified polyorganosiloxane.

A (V) Catalyst

The catalyst is one selected from the group consisting of platinum-alcohol complex, platinum-olefin complex, platinum-alkoxide complex, platinum-ether complex, platinum-ketone complex, isopropanol solution of chloroplatinic acid or platinum-vinyl complex. The catalyst in this process is preferably an isopropanol solution of chloroplatinic acid with the platinum content of 1-20 ppm. In a solution, the mass ratio of a catalyst in the modified polyorganosiloxane is 0.01-0.2%.

Component A1: The modified polyorganosiloxane A1 is obtained through reaction of the above hydrogen-containing polyorganosiloxane A (I), unsaturated polyether A (II), and α-olefin A (III), as well as a catalyst A (V), in a reactor at 80-180° C. for 0.5-3 hours.

In a solution, there are 5-25 parts by weight of a modified polyorganosiloxane A1 in an organosilicone defoaming agent.

Component A2: The modified polyorganosiloxane A2 is obtained through reaction of the above hydrogen-containing polyorganosiloxane A (I), unsaturated polyether A (II), and bivinyl-terminated polyorganosilicone A (IV), as well as a catalyst A (V), in a reactor at 80-180° C. for 0.5-3 hours.

In a solution, there are 5-25 parts by weight of a modified polyorganosiloxane A2 in an organosilicone defoaming agent.

B. Organosilicon Composition

The organosilicone composition according to the present invention is prepared from a hydrogen-containing polyorganosiloxane, an acrylate, a catalyst, an α-olefin, silica, and an MQ resin using a prior art known to those skilled in the art. In a solution, there are 2-20 parts by weight of an organosilicone composition in a defoaming agent, preferably 5-20 parts by weight, more preferably 8-15 parts by weight.

The range of choice of the hydrogen-containing polyorganosiloxane is the same as above, i.e. A(I). In a solution, there are 40-80 parts by weight of the hydrogen-containing polyorganosiloxane in an organosilicon composition.

The range of choice of the catalyst is the same as above, i.e. A(V), preferably an isopropanol solution of chloroplatinic acid with the platinum content of 1-20 ppm. In a solution, the mass ratio of a catalyst in an organosilicon composition is 0.01-0.2%.

The range of choice of the α-olefin is the same as above, i.e. A(III). In a solution, there are 10-30 parts by weight of the α-olefin in an organosilicon composition.

The silica includes hydrophobized or non-hydrophobized fumed silica or precipitated silica having a specific surface area of 50-500 m²/g. The precipitated silica or fumed silica having a specific surface area of 90-300 m²/g is preferable in the present invention. In a solution, there are 1-15 parts by weight of silica in an organosilicone composition.

The organosilicon resin refers to a highly cross-linked polyorganosiloxane having a spatial mesh structure, and the polyorganosiloxane having a spatial mesh structure is usually obtained through obtaining an acidic hydrolysate by hydrolyzing various mixtures of methyltrichlorosilane, dimethyldichlorosilane, phenyltrichlorosilane, diphenyldichlorosilane and methylphenyldichlorosilane in an organic solvent, such as toluene, and then removing acid by washing with water. The organosilicon resin used in the present invention is an MQ resin composed of chain units $CH_3SiO_{1/2}$ (called M units in organosilicone chemistry) and chain units $SiO_{4/2}$ (Q units), and the molar ratio between the two is (0.4-1.2): 1.0, preferably (0.5-0.8): 1.0. In a solution, there are 5-20 parts by weight of an MQ resin in an organosilicone composition.

The acrylate is esters of acrylic acid and its homologue, including methyl acrylate, ethyl acrylate, butyl acrylate, isobutyl acrylate, 2-methyl methacrylate, 2-ethyl methacrylate and 2-butyl methacrylate. In a solution, there are 3-15 parts by weight of an acrylate in an organosilicone composition.

A specific preparation process of an organosilicone composition B (i.e. component B) is as follows: firstly the above hydrogen-containing polyorganosiloxane is fully mixed with an acrylate, to which a catalyst is added at 70° C. Then, after the system is heated to 100° C. and kept at the temperature for 1 hour, an α-olefin is added thereto, and further kept at the temperature for 2 hours. Finally, silica and an organosilicon resin are added and mixed to obtain the organosilicone composition B.

C. Thickening Agent

The thickening agent is selected from the group consisting of polyacrylamide, carbomer, xanthan, cellulose and polyacrylic acid. Polyacrylic acid thickening agent is preferably used in the present invention to thicken the system by regulating the pH value using an alkali and controlling the viscosity of the system to 1000-5000 mPa·s. In a solution, there are 0.5-5 parts by weight of a thickening agent in a defoaming agent.

D. Water:

The water is deionized water. In a solution, there are 50-90 parts by weight of water in a defoaming agent. The mass content of water in a defoaming agent can be 50-90%.

E. Emulsifier

The emulsifier is an anionic, cationic or non-ionic surfactant, preferably a non-ionic surfactant.

The non-ion surfactant is selected from the group consisting of polyoxyethylenenonylphenyl ether, polyoxyethyleneoctylphenol ether, polyoxyethylene lauryl ether, polyoxyethyleneoleyl ether, sorbitanmonstearate, sorbitanmonooleate, sorbitantristearate, sorbitantrioleate, polyoxyethylenesorbitanmonostearate, polyoxyethylenesorbitanmonooleate, polyoxyethylenesorbitantristearate, and polyoxyethylene castor oil. The emulsifiers may be used separately, or mixed before use.

In a solution, there are 1-10 parts by weight of an emulsifier in an organosilicone defoaming agent.

F. Preservative

The preservative is one or more selected from the group consisting of methyl-p-hydroxybenzoate, ethyl-p-hydroxybenzoate, propyl-p-hydroxybenzoate, butyl-p-hydroxybenzoate, sodium diacetate, benzoic acid and sodium salt thereof, sorbic acid and potassium salt thereof, dimethyl fumarate, 2-methyl-4-isothiazolin-3-one, 5-chloro-2-methyl-4-isothiazolin-3-one, 4,5-dichloro-2-methyl-4-isothiazolin-3-one, 2-n-octyl-4-isothiazoline-3-one, 4,5-dichloro-2-n-octyl-4-isothiazolin-3-one, 5-chloro-2-n-octyl-4-isothiazolin-3-one, 1,2-benzo-isothiazolin-3-one, n-nutyl-1,2-benzo-isothiazolin-3-one, and 2-methyl-4,5-propylidene-4-isothiazolin-3-one. The preservatives may be used separately, or any two or more of them may be mixed before use.

In a solution, there are 0.01-0.5 parts by weight of an preservative in an organosilicone defoaming agent.

In the present invention, a defoaming agent can be prepared by controlling its pH value in an appropriate range according to an existing method, so as to facilitate preparation, production or use of the defoaming agent, wherein the pH range is generally 5.0-7.0, preferably 6.5-7.0. The pH value of defoaming can be regulated using an acid or alkali commonly used in this field.

In a technical solution, the defoaming agent of the present invention can be prepared using the following process: a modified polyorganosiloxane A1, a modified polyorganosiloxane A2 and an organosilicon composition B are mixed, heated to 50-80° C., and fully stirred; then in the case of keeping a constant temperature while stirring, a part of a thickening agent and water are added, and the pH value is regulated to 6.5-7.0; finally, the emulsion thus obtained is homogenized, and the balance amount of the thickening agent and water are added. The amount of the first added thickening agent is 70-90% based on the total mass of the thickening agent, and the amount of the first added water is 30-60% based on the total mass of water.

In a technical solution, a defoaming agent of the present invention can be prepared specifically using a process comprising the following steps:

(1) The above modified polyorganosiloxane A1 and A2, and organosilicon composition B are mixed, heated to 50-80° C., and stirred at a stirring speed of 100-400 rpm for 0.5-1.5 hours;

(2) In the case of keeping a constant temperature, 30-60% of water and 70-90% of a thickening agent are added while stirring, and the pH is regulated to 6.5-7.0;

(3) The above emulsion is homogenized using a colloid mill, and diluted with the balance amount of the thickening agent and water to obtain the defoaming agent product.

When an organosilicone defoaming agent of the present invention contains an emulsifier, the emulsifier is generally mixed with A1 and A2 before addition. When an organosilicone defoaming agent of the present invention contains a preservative, the preservative is finally added to the product.

The inventor found that in the process of preparing a defoaming agent of an organosilicon composition having an alkyl-modified group, modified polyorganosiloxane A1 and A2 are compounded, and the compatibility and synergistic effect between the two and other components enable the obtained defoaming agent emulsion to have a good defoaming performance, clarity and excellent stability in a liquid detergent, so as to ensure that the defoaming agent neither precipitates, nor agglomerates in a laundry detergent, and effectively solve the phenomenon, such as coagulation and aggregation.

There are many other different combinations of modified polyorganosiloxane. The compounding effects are all worse than the compounding effect of the modified polyorganosiloxane A1 and A2 according to the present invention. Different combinations of modified polyorganosiloxane will exhibit different properties, which will be described specifically through examples and comparative examples.

DETAILED DESCRIPTION

In the following examples, the monomers used in a modified polyorganosiloxane are respectively as follows:

A(I) Hydrogen-containing polyorganosiloxane: $H_cMe_{3-c}SiO(MeHSiO)_a(Me_2SiO)_bSiMe_{3-c}H_c$;

A (II) Unsaturated polyether: $ViCH_2O(EO)_x(PO)_yR^1$;

A(III) α-olefin: $Vi(CH_2)_zH$;

A(IV) Bivinyl-terminated polyorganosilicone: $Vi(R^2)_2SiO((R^2)_2SiO)_mSi(R^2)_2Vi$.

Please see Table 1 for details of specifically used materials.

TABLE 1

Components A1-1 to A1-4, A2-5 to A2-8 and A-9 to A-14 of a modified polysiloxane

| General formula/use level | A(I) | | | | A(II) | | | | A(III) | | A(IV) | | |
|---|---|---|---|---|---|---|---|---|---|---|---|---|---|
| | a | b | c | Use level/g | x | y | $R^1$ | Use level/g | z | Use level/g | m | $R^2$ | Use level/g |
| A1-1 | 15 | 45 | 0 | 250 | 0 | 50 | —$CH_3$ | 230 | 8 | 120 | — | — | 0 |
| A1-2 | 65 | 190 | 1 | 250 | 20 | 0 | —H | 120 | 16 | 230 | — | — | 0 |
| A1-3 | 100 | 170 | 1 | 300 | 35 | 90 | —$NH_3$ | 200 | 12 | 100 | — | — | 0 |
| A1-4 | 30 | 150 | 0 | 450 | 30 | 70 | —$CH_3$ | 90 | 16 | 60 | — | — | 0 |
| A2-5 | 15 | 45 | 0 | 250 | 0 | 50 | —$CH_3$ | 250 | — | 0 | 210 | —$CH_3$ | 100 |
| A2-6 | 65 | 190 | 1 | 250 | 20 | 0 | —H | 230 | — | 0 | 390 | —$CH_3$ | 120 |
| A2-7 | 100 | 170 | 1 | 300 | 35 | 90 | —$NH_3$ | 150 | — | 0 | 280 | —$CH_3$ | 150 |
| A2-8 | 30 | 150 | 0 | 400 | 30 | 70 | —$CH_3$ | 100 | — | 0 | 340 | —$CH_3$ | 100 |
| A-9 | 15 | 45 | 0 | 250 | 0 | 50 | —$CH_3$ | 200 | 8 | 100 | 210 | —$CH_3$ | 50 |
| A-10 | 65 | 190 | 1 | 250 | 20 | 0 | —$CH_3$ | 150 | 16 | 130 | 390 | —$CH_3$ | 70 |

TABLE 1-continued

Components A1-1 to A1-4, A2-5 to A2-8 and A-9 to A-14 of a modified polysiloxane

| General formula/use level | Monomer | | | | | | | | | | | | | |
|---|---|---|---|---|---|---|---|---|---|---|---|---|---|---|
| | A(I) | | | | A(II) | | | | A(III) | | A(IV) | | | |
| | a | b | c | Use level/g | x | y | $R^1$ | Use level/g | z | Use level/g | m | $R^2$ | Use level/g |
| A-11 | 100 | 170 | 1 | 300 | 35 | 90 | —$CH_3$ | 120 | 12 | 80 | 280 | —$CH_3$ | 100 |
| A-12 | 30 | 150 | 0 | 350 | 30 | 70 | —$CH_3$ | 90 | 16 | 60 | 340 | —$CH_3$ | 50 |
| A-13 | 100 | 170 | 1 | 300 | 35 | 90 | —$CH_3$ | 300 | — | 0 | — | — | 0 |
| A-14 | 30 | 150 | 0 | 450 | 30 | 70 | —$CH_3$ | 150 | — | 0 | — | — | 0 |

Note:
The dynamic viscosity of the above A(I) hydrogen-containing polyorganosiloxane at 25° C. is 50-5,000 mPa · s; the dynamicviscosity of the A (IV) bivinyl-terminated polyorganosiloxane at 25° C. is 100-2,000 mPa · s.

Modified polysiloxane A1-1 to A1-4 (i.e. A1-1, A1-2, A1-3 and A1-4) are prepared through reaction of A (I), A (II) and A (III) after mixing them, A2-5 to A2-8 (i.e. A2-5, A2-6, A2-7 and A2-8) are prepared through reaction of A (I), A (II) and A (IV) after mixing them, A-9 to A-12 are prepared through reaction of A (I), A (II), A(III) and A (IV) after mixing them, and A-13 and A-14 are prepared through reaction of A (I) and A (II) after mixing them.

The preparation process of each modified polysiloxane comprises first adding the above use level of A (I), A (II), A (III) and A (IV), as well as a catalyst A (V), in a reactor at 80-180° C. for 0.5-3 hours. The catalyst A (V) is an isopropanol solution of chloroplatinic acid with the platinum content of 5-15 ppm. In preparing A1-1 to A1-4 modified polysiloxane, the reaction temperature is 100-110° C., and the use level of the catalyst is 0.05-0.08% based on the mass of the modified polysiloxane. In preparing A2-5 to A2-8, the reaction temperature is 110-130° C., and the use level of the catalyst is 0.04-0.06% based on the mass of the modified polysiloxane. In preparing A-9 to A-12, the reaction temperature is 100-110° C., and the use level of the catalyst is 0.05-0.08% based on the mass of the modified polysiloxane.

Organosilicon composition B1 was prepared as follows: 50 g of hydrogen-containing polyorganosiloxane $Me_3SiO(MeHSiO)_{15}(Me_2SiO)_{45}SiMe_3$ was fully mixed with 12 g of methyl acrylate, to which a catalyst isopropanol solution of chloroplatinic acid (platinum content: 10-15 ppm) was added at 70° C., wherein the use level of the catalyst was 0.05% based on the mass of the composition. The system was heated to 100° C. and kept at the temperature for 1 hour, and then 28 g of α-olefin $Vi(CH_2)_8H$ was added thereto. Finally, 13 g of precipitated silica (60 m²/g) and 5 g of an MQ silicon resin (molar ratio of M to Q=0.5:1.0) were added and mixed to obtain the target product.

Organosilicon composition B2 was prepared as follows: 60 g of hydrogen-containing polyorganosiloxane $HMe_2SiO(MeHSiO)_{65}(Me_2SiO)_{190}SiMe_2H$ and 14 g of methyl acrylate were fully mixed, to which a catalyst isopropanol solution of chloroplatinic acid (platinum content: 10-15 ppm) was added at 69° C., wherein the use level of the catalyst was 0.05% based on the mass of the composition. The system was heated to 100° C. and kept at the temperature for 1 hour, and then 20 g of α-olefin $Vi(CH_2)_{16}H$ was added thereto. Finally, 10 g of fumed silica (80 m²/g) and 10 g of an MQ silicon resin (molar ratio of M to Q=0.6:1.0) were added and mixed to obtain the target product.

Organosilicon composition B3 was prepared as follows: 70 g of hydrogen-containing polyorganosiloxane $HMe_2SiO(MeHSiO)_{100}(Me_2SiO)_{170}SiMe_2H$ was fully mixed with 10 g of ethyl acrylate, to which a catalyst isopropanol solution of chloroplatinic acid (platinum content: 10-15 ppm) was added at 71° C., wherein the use level of the catalyst was 0.05% based on the mass of the composition. The system was heated to 100° C. and kept at the temperature for 1 hour, and then 12 g of α-olefin $Vi(CH_2)_{12}H$ was added thereto. Finally, 3 g of fumed silica (100 m²/g) and 20 g of an MQ silicon resin (molar ratio of M to Q=0.7:1.0) were added and mixed to obtain the target product.

Organosilicon composition B4 was prepared as follows: 50 g of hydrogen-containing polyorganosiloxane $Me_3SiO(MeHSiO)_{30}(Me_2SiO)_{150}SiMe_3$ was fully mixed with 5 g of butyl acrylate, to which a catalyst isopropanol solution of chloroplatinic acid (platinum content: 10-15 ppm) was added at 70° C., wherein the use level of the catalyst was 0.05% based on the mass of the composition. The system was heated to 100° C. and kept at the temperature for 1 hour, and then 28 g of α-olefin $Vi(CH_2)_8H$ was added thereto. Finally, 13 g of fumed silica (200 m²/g) and 5 g of an MQ silicon resin (molar ratio of M to Q=0.9:1.0) were added and mixed to obtain the target product.

Organosilicon composition B5 was prepared as follows: 60 g of hydrogen-containing polyorganosiloxane $HMe_2SiO(MeHSiO)_{65}(Me_2SiO)_{190}SiMe_2H$ was fully mixed with 10 g of ethyl methacrylate, to which a catalyst isopropanol solution of chloroplatinic acid (platinum content: 10-15 ppm) was added at 70° C., wherein the use level of the catalyst was 0.05% based on the mass of the composition. The system was heated to 100° C. and kept at the temperature for 1 hour, and then 12 g of α-olefin $Vi(CH_2)_{12}H$ was added thereto. Finally, 3 g of precipitated silica (300 m²/g) and 18 g of an MQ silicon resin (molar ratio of M to Q=0.8:1.0) were added and mixed to obtain the target product.

Organosilicon composition B6 was prepared as follows: 70 g of hydrogen-containing polyorganosiloxane $HMe_2SiO(MeHSiO)_{100}(Me_2SiO)_{170}SiMe_2H$ was fully mixed with 10 g of methyl acrylate, to which a catalyst isopropanol solution of chloroplatinic acid (platinum content: 10-15 ppm) was added at 70° C., wherein the use level of the catalyst was 0.05% based on the mass of the composition. The system was heated to 100° C. and kept at the temperature for 1 hour, and then 20 g of α-olefin $Vi(CH_2)_{16}H$ was added thereto. Finally, 10 g of precipitated silica (300 m²/g) and 10 g of an MQ silicon resin (molar ratio of M to Q=0.6:1.0) were added and mixed to obtain the target product.

Please refer to the prior art for the composition, operating conditions and the like that are not clearly mentioned in the following examples.

Examples 1-10

The defoaming agent products in examples 1-10 were respectively prepared as per the formulae in Table 2.

TABLE 2

| Example Group | Component A and use level | | Component B and use level | | Component C and use level | Component D and use level | Component E and use level | Component F and use level | Defoaming agent solid content |
|---|---|---|---|---|---|---|---|---|---|
| Example 1 | A1-1 10 g | A2-5 20 g | B1 | 9 g | Polyacrylic acid thickening agent 1 g | Water 60 g | — | — | 40% |
| Example 2 | A1-2 10 g | A2-6 16 g | B2 | 13 g | Polyacrylic acid thickening agent 1 g | Water 60 g | — | — | 40% |
| Example 3 | A1-3 10 g | A2-8 16 g | B3 | 13 g | Polyacrylic acid thickening agent 1 g | Water 60 g | — | — | 40% |
| Example 4 | A1-4 10 g | A2-7 16 g | B4 | 13 g | Carbomer 1 g | Water 60 g | — | — | 40% |
| Example 5 | A1-1 10 g | A2-8 16 g | B4 | 13 g | Polyacrylamide 1 g | Water 60 g | — | — | 40% |
| Example 6 | A1-1 10 g | A2-5 9 g | B1 | 10 g | Polyacrylic acid thickening agent 1 g | Water 70 g | — | — | 30% |
| Example 7 | A1-1 4 g | A2-5 6 g | B1 | 9 g | Polyacrylic acid thickening agent 1 g | Water 80 g | — | — | 20% |
| Example 8 | A1-1 10 g | A2-5 15 g | B1 | 10 g | Polyacrylic acid thickening agent 1 g | Water 60 g | Sorbitan stearate 60 2 g Polyoxyethylene sorbitan-monostearate 60 2 g | — | 40% |
| Example 9 | A1-1 10 g | A2-5 15 g | B1 | 10 g | Polyacrylic acid thickening agent 1 g | Water 60 g | Polyoxyethylene lauryl ether 4 g | — | 40% |
| Example 10 | A1-1 7 g | A2-5 9 g | B1 | 9 g | Polyacrylic acid thickening agent 0.7 g | Water 70 g | Sorbitan stearate 60 2 g Polyoxyethylene sorbitan monostearate 60 2 g | 2-methyl-4-isothiazolin-3-one 0.3 | 30% |

The water in the above table was deionized water.

The preparation process in Examples 1-3: The component A and component B in Table 2 were mixed, heated to 55-60° C., and fully stirred; the system was kept at a constant temperature, 40-50% of the component D and 90% of the component C were slowly added thereto while stirring, and the pH was regulated to 6.5-7. The above emulsion was homogenized, and was diluted with the balance amount of the component C and component D to obtain the defoaming agent product with corresponding solid content.

The preparation process in Examples 4-7: The component A and component B in Table 2 were mixed, heated to 60-70° C., and fully stirred; the system was kept at a constant temperature, 30-35% of the component D and 85% of the component C were slowly added thereto while stirring, and the pH was regulated to 6.5-7. The above emulsion was homogenized, and was diluted with the balance amount of the component C and component D to obtain the defoaming agent product with corresponding solid content.

The preparation process in Examples 8-9: The component A, component B and component E in Table 2 were mixed, heated to 50-80° C., and fully stirred; the system was kept at a constant temperature, 45-50% of the component D and 90% of the component C were slowly added thereto while stirring, and the pH was regulated to 6.5-7. The above emulsion was homogenized, and was diluted with the balance amount of the component C and component D to obtain the defoaming agent product with corresponding solid content.

The preparation process in Example 10: The component A, component B and component E in Table 2 were mixed, heated to 50-80° C., and fully stirred; the system was kept at a constant temperature, 30-40% of the component D and 85% of the component C were slowly added thereto while stirring, and the pH was regulated to 6.5-7. The above emulsion was homogenized, and was diluted with the balance amount of the component C and component D, and then the component F was added to obtain the defoaming agent product with corresponding solid content.

Comparative Examples 1-14

The defoaming agents in comparative examples 1-14 were respectively prepared as per the formulae in Table 3. In each comparative example, the defoaming agent with corresponding solid content was prepared respectively using the process in Example 1 or Example 9.

TABLE 3

| Comparative example group | Component A and use level | Component B and use level | Component C and use level | Component D and use level | Component E and use level | Defoaming agent solid content |
|---|---|---|---|---|---|---|
| Comparative example 1 | A1-1 30 g | — | B1 9 g | Polyacrylic acid thickening agent 1 g | Water 60 g | 40% |

TABLE 3-continued

| Comparative example group | Component A and use level | Component B and use level | Component C and use level | Component D and use level | Component E and use level | Defoaming agent solid content |
|---|---|---|---|---|---|---|
| Comparative example 2 | — | A2-6 30 g | B1 9 g | Polyacrylic acid thickening agent 1 g | Water 60 g | | 40% |
| Comparative example 3 | — | A-9 30 g | B1 9 g | Polyacrylic acid thickening agent 1 g | Water 60 g | | 40% |
| Comparative example 4 | — | A-13 30 g | B19 g | Polyacrylic acid thickening agent 1 g | Water 60 g | | 40% |
| Comparative example 5 | A1-1 10 g | A-13 20 g | B19 g | Polyacrylamide 1 g | Water 60 g | | 40% |
| Comparative example 6 | A1-4 10 g | A-9 20 g | B19 g | Polyacrylic acid thickening agent 1 g | Water 60 g | | 40% |
| Comparative example 7 | A2-5 10 g | A-10 20 g | B19 g | Polyacrylic acid thickening agent 1 g | Water 60 g | | 40% |
| Comparative example 8 | A2-6 10 g | A-12 20 g | B19 g | Polyacrylic acid thickening agent 1 g | Water 60 g | | 40% |
| Comparative example 9 | A1-1 10 g | A-13 9 g | B110 g | Polyacrylic acid thickening agent 1 g | Water 70 g | | 30% |
| Comparative example 10 | A2-6 5 g | A-14 7 g | B17 g | Polyacrylamide 1 g | Water 80 g | | 20% |
| Comparative example 11 | A-10 10 g | A-14 20 g | B1 9 g | Polyacrylic acid thickening agent 1 g | Water 60 g | | 40% |
| Comparative example 12 | A1-1 26 g | | B1 10 g | Polyacrylic acid thickening agent 1 g | Water 60 g | Sorbitan stearate 60 2 g Polyoxyethylene sorbitan monostearate 60 2 g | 40% |
| Comparative example 13 | A1-1 30 g | — | B3 9 g | Polyacrylic acid thickening agent 1 g | Water 60 g | — | 40% |
| Comparative example 14 | A1-1 10 g | A-13 20 g | B5 9 g | Polyacrylic acid thickening agent 1 g | Water 60 g | — | 40% |

Performance test of the defoaming agent obtained in each example was respectively made as follows.

Performance test of an organosilicone defoaming agent:

(1) Machine Wash Performance Test in a Liquid Detergent

The washing machine used in the test was a drum washing machine of Zanussi brand, model: ZWH6125, capacity: 7 kg. Test method: 50 g of detergent available on the market, 0.1 g of the prepared organosilicone emulsion and 20 kg of water were added to the washing machine, and then the program for cotton and linen was selected. The view window of the washing machine is marked with 5 scale values, respectively representing 0, 25%, 50%, 75% and 100% height of the view window. "0" is the start representing no foam, while "100%" represents full of foam. The foam height was recorded once every 5 minutes, and was recorded at the time of stop. The higher the value is, the foam scale value in the washing machine is, and the worse the defoaming performance is; the lower the foam scale value in equivalent time is, the better the defoaming performance of the product is. The test results are shown in Table 4.

TABLE 4

| | Time/min | | | | | | | | | |
|---|---|---|---|---|---|---|---|---|---|---|
| | 5 | 10 | 15 | 90 | 25 | 30 | 35 | 40 | 45 | 50 |
| Example 1 | 17 | 24 | 29 | 33 | 37 | 43 | 48 | 54 | 56 | 59 |
| Example 3 | 15 | 23 | 39 | 34 | 36 | 41 | 45 | 49 | 55 | 58 |

TABLE 4-continued

| | Time/min | | | | | | | | | |
|---|---|---|---|---|---|---|---|---|---|---|
| | 5 | 10 | 15 | 90 | 25 | 30 | 35 | 40 | 45 | 50 |
| Example 6 | 20 | 26 | 33 | 37 | 40 | 44 | 53 | 59 | 61 | 66 |
| Example 7 | 23 | 30 | 35 | 41 | 45 | 49 | 52 | 57 | 65 | 73 |
| Example 9 | 19 | 22 | 32 | 35 | 40 | 42 | 47 | 52 | 57 | 60 |
| Comparative example 1 | 21 | 26 | 30 | 36 | 39 | 45 | 52 | 56 | 59 | 64 |
| Comparative example 2 | 23 | 29 | 32 | 37 | 40 | 45 | 54 | 59 | 62 | 66 |
| Comparative example 3 | 20 | 24 | 29 | 34 | 40 | 44 | 54 | 59 | 62 | 65 |
| Comparative example 4 | 28 | 32 | 39 | 45 | 49 | 54 | 57 | 62 | 69 | 76 |
| Comparative example 5 | 24 | 29 | 32 | 36 | 38 | 44 | 49 | 54 | 59 | 64 |
| Comparative example 7 | 25 | 30 | 34 | 37 | 39 | 47 | 51 | 54 | 62 | 67 |
| Comparative example 9 | 26 | 32 | 37 | 45 | 49 | 53 | 57 | 62 | 66 | 68 |
| Comparative example 10 | 26 | 34 | 37 | 48 | 52 | 55 | 60 | 63 | 67 | 70 |
| Comparative example 12 | 39 | 35 | 41 | 45 | 49 | 54 | 59 | 65 | 71 | 79 |
| Comparative example 14 | 40 | 45 | 49 | 53 | 58 | 64 | 68 | 72 | 76 | 80 |

The defoaming performance of the defoaming agent in Examples 2, 4-5, 8 and 10 is close to or equivalent to that of the defoaming agent in Example 1. The comparison in Table 4 shows that there are excellent compatibility and synergistic effect between the components A1 and A2 in the defoaming agent. The defoaming performance of the defoaming agent in the vast majority of examples is far better or better than that of the defoaming agent using only a single component A or using a combination that has a structure close to the structure of A1 and A2, but is not A1 or A2 in the comparative examples.

(2) Compatibility:

1% organosilicone defoaming agent emulsion was added to the detergent samples. After fully stirring, the samples were observed whether to have floating oil or aggregates. After kept at 40° C. for a week, the mixture state was visually observed. The test results were shown in Table 5.

Visual observation as per the following grades:

1=Clear without floating oil on the surface or container "annulus".

2=A little annulus or floating oil on the surface; redispersible in a detergent.

3=Moderate amount of annulus or floating oil on the surface; difficult to be dispersed again.

4=Obvious annulus or floating oil on the surface; very difficult to be dispersed again.

5=Visually observed aggregation or flocculation of siloxane; and unable to be dispersed again.

(3) Clarity Test:

0.5% emulsion was added to a laundry detergent, and fully stirred. After foams fully disappeared, the transparency level was observed with white paper as a substrate, and was graded as 1, 2, 3 and 4, respectively being clear, slightly turbid, turbid and more turbid. The test results were shown in Table 5.

TABLE 5

|  | Compatibility | Clarity |
| --- | --- | --- |
| Example 1 | 1 | 2 |
| Example 3 | 1 | 2 |
| Example 6 | 1 | 1 |
| Example 7 | 1 | 1 |
| Example 9 | 1 | 2 |
| Comparative example 1 | 1 | 2 |
| Comparative example 2 | 4 | 3 |
| Comparative example 3 | 3 | 2 |
| Comparative example 4 | 5 | 2 |
| Comparative example 5 | 3 | 2 |
| Comparative example 7 | 4 | 2 |
| Comparative example 9 | 3 | 2 |
| Comparative example 10 | 4 | 2 |
| Comparative example 12 | 5 | 3 |
| Comparative example 14 | 5 | 3 |

The compatibility and clarity of the defoaming agent in Examples 2, 4-5, 8 and 10 are close to or equivalent to the compatibility and clarity of the defoaming agent in Example 1. As can be seen from the comparison in Table 5, the compatibility and synergistic effect between the components A1 and A2 in a defoaming agent enable it to be closely bound with an organosilicon composition, not only have a better defoaming performance, but also improve the emulsion stability, and have more prominent advantages in compatibility and clarity. As can be seen from the comparative examples, the effect is far better than that of the defoaming agent using only a single component A or using a combination that has a structure close to the structure of A1 and A2, but is not A1 or A2.

What is claimed is:

1. A defoaming agent for a liquid detergent, comprising the following components:

a component A1: 2-25 parts by weight of a modified polyorganosiloxane formed by reacting a hydrogen-containing polyorganosiloxane, an unsaturated polyether and an α-olefin;

a component A2: 2-25 parts by weight of a modified polyorganosiloxane formed by reacting a hydrogen-containing polyorganosiloxane, an unsaturated polyether and a bivinyl-terminated polyorganosiloxane, wherein the ratio of weight parts of the raw materials used in the component A2 is: 40-80 parts by weight of the hydrogen-containing polyorganosiloxane, 20-40 parts by weight of the unsaturated polyether and 10-30 parts by weight of the bivinyl-terminated polyorganosiloxane;

a component B: 2-20 parts by weight of an organosilicon composition composed of an acrylate, a polyorganosiloxane modified through grafting with an α-olefin, silica and an organosilicon resin;

a component C: 0.5-5 parts by weight of a thickening agent; and a component D: 50-90 parts by weight of water.

2. The defoaming agent for a liquid detergent according to claim 1, further comprising a component E: 1-10 parts by weight of an emulsifier; and a component F: 0.01-0.5 parts by weight of a preservative.

3. The defoaming agent for a liquid detergent according to claim 2, wherein the emulsifier is one or more selected from the group consisting of polyoxyethylene nonylphenyl ether, polyoxyethylene octylphenol ether, polyoxyethylene lauryl ether, polyoxyethylene oleyl ether, sorbitan monstearate, sorbitan monooleate, sorbitan tristearate, sorbitan trioleate, polyoxyethylene sorbitan monostearate, polyoxyethylene sorbitan monooleate, polyoxyethylene sorbitan tristearate, and polyoxyethylene castor oil; and the preservative is one or more selected from the group consisting of methyl-p-hydroxybenzoate, ethyl-p-hydroxybenzoate, propyl-p-hydroxybenzoate, butyl-p-hydroxybenzoate, sodium diacetate, benzoic acid and sodium salt thereof, sorbic acid and potassium salt thereof, dimethyl fumarate, 2-methyl-4-isothiazolin-3-one, 5-chloro-2-methyl-4-isothiazolin-3-one, 4,5-dichloro-2-methyl-4-isothiazolin-3-one, 2-n-octyl-4-isothiazoline-3-one, 4,5-dichloro-2-n-octyl-4-isothiazolin-3-one, 5-chloro-2-n-octyl-4-isothiazolin-3-one, 1,2-benzo-isothiazolin-3-one, n-nutyl-1,2-benzo-isothiazolin-3-one, and 2-methyl-4,5-propylidene-4-isothiazolin-3-one.

4. The defoaming agent for a liquid detergent according to claim 1, wherein in the defoaming agent, there are 4-15 parts by weight of the component A1, 5-20 parts by weight of the component A2, 5-15 parts weight of the component B, 0.5-5 parts by weight of the component C, and 60-80 parts by weight of the component D.

5. The defoaming agent for a liquid detergent according to claim 1, wherein the component A1 modified polyorganosiloxane is obtained through reaction of the hydrogen-containing polyorganosiloxane, the unsaturated polyether and the α-olefin in the presence of a catalyst at 80-180° C.

6. The defoaming agent for a liquid detergent according to claim 5, wherein the ratio of weight parts of the raw materials used in the component A1 is: 40-80 parts by weight of the hydrogen-containing polyorganosiloxane, 20-40 parts by weight of the unsaturated polyether and 10-30 parts by weight of the α-olefin.

7. The defoaming agent for a liquid detergent according to claim 1, wherein the component A2 modified polyorganosiloxane is obtained through reaction of the hydrogen-containing polyorganosiloxane, the unsaturated polyether and the bivinyl-terminated polyorganosiloxane in the presence of a catalyst at 80-180° C.

8. The defoaming agent for a liquid detergent according to claim 1, wherein the preparation process of the component B is as follows: firstly the hydrogen-containing polyorganosiloxane is fully mixed with the acrylate, to which a catalyst is added at 60-80° C., then, after the system is heated to 90-110° C. and kept at the temperature, the α-olefin is added thereto, and further kept at the temperature, and finally, silica and the organosilicon resin are added and mixed to obtain the component B.

9. The defoaming agent for a liquid detergent according to claim 8, wherein the ratio of weight parts of the raw materials used in the component B is: 40-80 parts by weight of the hydrogen-containing polyorganosiloxane, 3-15 parts by weight of the acrylate, 10-30 parts by weight of the α-olefin, 1-15 parts by weight of silica and 5-20 parts by weight of the organosilicon resin.

10. The defoaming agent for a liquid detergent according to claim 1, wherein the hydrogen-containing polyorganosiloxane of the component A1 or the component A2 at least has a general structural formula as follows: $H_cMe_{3-c}SiO(MeHSiO)_a(Me_2SiO)_bSiMe_{3-c}H_c$, wherein Me is a methyl group, c is 0 or 1, a is an integer from 2 to 100, and b is an integer from 20 to 300.

11. The defoaming agent for a liquid detergent according to claim 10, wherein a is an integer from 10 to 70, b is an integer from 40 to 300, and the dynamic viscosity of a hydrogen-containing polyorganosiloxane at 25° C. is 20-5,000 mPa·s.

12. The defoaming agent for a liquid detergent according to claim 1, wherein the unsaturated polyether of the component A1 or the component A2 has a general structural formula as follows: $ViCH_2O(EO)_x(PO)_yR^1$, wherein Vi is a vinyl, $R^1$ is selected from hydrogen, alkyl group having 1 to 6 carbon atoms, ester group, epoxy group or amino group; EO is ethylene oxide, PO is propylene oxide, x and y are degrees of polymerization, x is an integer from 0 to 150; and y is an integer from 0 to 150, and x and y cannot both be 0.

13. The defoaming agent for a liquid detergent according to claim 12, wherein x is an integer from 0 to 40, y is an integer from 0 to 100, and x and y cannot both be 0.

14. The defoaming agent for a liquid detergent according to claim 1, wherein the α-olefin of the component A1 has a general structural formula as follows: $Vi(CH_2)_zH$, wherein Vi is a vinyl, and z is an integer from 1 to 36.

15. The defoaming agent for a liquid detergent according to claim 14, wherein z is an integer from 6 to 18.

16. The defoaming agent for a liquid detergent according to claim 1, wherein the bivinyl-terminated polyorganosiloxane has a general structural formula as follows: $Vi(R^2)_2SiO((R^2)_2SiO)_mSi(R^2)_2Vi$, wherein Vi is a vinyl, m is an integer from 100 to 500, and $R^2$ is an alkyl group having 1-6 carbon atoms.

17. The defoaming agent for a liquid detergent according to claim 16, wherein m is an integer from 200 to 400, $R^2$ is a methyl group, and the dynamic viscosity of a bivinyl-terminated polyorganosiloxane at 25° C. is 50-2,000 mPa·s.

18. The defoaming agent for a liquid detergent according to claim 1, wherein the pH value of the defoaming agent is 6.5-7.

19. The defoaming agent for a liquid detergent according to claim 1, wherein the acrylate is one or a mixture of more selected from the group consisting of methyl acrylate, ethyl acrylate, butyl acrylate, isobutyl acrylate, 2-methyl methacrylate, 2-ethyl methacrylate and 2-butyl methacrylate; the silica is selected from fumed silica or precipitated silica; the organosilicon resin is an MQ resin composed of a chain unit $CH_3SiO_{1/2}$ and a chain unit $SiO_{4/2}$; the catalyst for preparing the component A1 or the component A2 is selected from the group consisting of platinum-alcohol complex, platinum-olefin complex, platinum-alkoxide complex, platinum-ether complex, platinum-ketone complex, isopropanol solution of chloroplatinic acid and platinum-vinyl complex.

20. The defoaming agent for a liquid detergent according to claim 1, wherein the silica has a specific surface area of 50-500 m²/g, and the molar ratio between the chain units $CH_3SiO_{1/2}$ and the chain units $SiO_{4/2}$ is (0.4-1.2):1.0.

21. The defoaming agent for a liquid detergent according to claim 1, wherein the thickening agent is one or more selected from the group consisting of polyacrylamide, carbomer, xanthan, cellulose and polyacrylic acid thickening agent.

22. The defoaming agent for a liquid detergent according to claim 1, wherein the defoaming agent is prepared using the following process: the modified polyorganosiloxane A1, the modified polyorganosiloxane A2 and the organosilicon composition B are mixed, heated to 50-80° C., and fully stirred; then in the case of keeping a constant temperature while stirring, a first part of the thickening agent and water are added, and the pH value is regulated to 6.5-7.0; and finally, the emulsion thus obtained is homogenized, and the balance amount of the thickening agent and water are added.

23. The defoaming agent for a liquid detergent according to claim 22, wherein the amount of the first part of the thickening agent is 70-90% based on the total mass of the thickening agent, and the amount of the first part of the added water is 30-60% based on the total mass of water.

* * * * *